United States Patent [19]

Yamashita et al.

[11] Patent Number: 4,870,280
[45] Date of Patent: Sep. 26, 1989

[54] RADIATION DETECTOR

[75] Inventors: Takaji Yamashita; Hiroshi Uchida; Tomohide Omura, all of Shizuoka, Japan

[73] Assignees: Hamamatsu Photonics Kabushiki, Shizuoka; Research Development Corporation of Japan, Tokyo, both of Japan

[21] Appl. No.: 130,897

[22] Filed: Dec. 10, 1987

[30] Foreign Application Priority Data

Dec. 11, 1986 [JP] Japan .................................. 61-295671

[51] Int. Cl.$^4$ .......................... G01T 1/20; G01T 1/202
[52] U.S. Cl. ................................ 250/368; 250/363.01; 250/366
[58] Field of Search ................. 250/366, 368, 363 SR, 250/370.11, 363 R

[56] References Cited

U.S. PATENT DOCUMENTS 3,825,758  7/1974  Miraldi ................................ 250/366
4,618,765 10/1986  Sonne ................................. 250/269

FOREIGN PATENT DOCUMENTS 11380  2/1981  Japan ................................. 250/368

Primary Examiner—Janice A. Howell
Assistant Examiner—Constantine Hannaher
Attorney, Agent, or Firm—Finnegan, Henderson, Farabow, Garrett, & Dunner

[57] ABSTRACT

A radiation detector for detecting the axial position of radiation incident to a scintillation element. Roughened surface portions are selectively configured and interstitially positioned relative to mirror-polished surface portions at discrete intervals along the axis of the element for optimizing the position resolution by varying the light reflection characteristics of the element.

15 Claims, 7 Drawing Sheets

RADIATION DETECTOR

BACKGROUND OF THE INVENTION

The present invention relates to a radiation detector provided with a scintillation element optically coupled to photodetectors for detecting the axial position of radiation incident to the scintillation element, and, more particularly, to a method of optimized position resolution by varying the light reflection characteristics of the scintillation element.

Conventional radiation detectors of the scintillator type have at least one scintillator comprising a scintillation crystal and a pair of photodetectors optically coupled to the scintillation crystal. Radiation entering into the crystal (for example, gamma-rays, neutrons, other high-energy particles), is changed into light at each point by a process known as scintillation. A large fraction of the light is transmitted to the photodetectors at either end of the crystal, resulting in the production of photoelectrons which are multiplied to yield a measurable current pulse for counting purposes. On the basis of measured and calculated comparisons of the relative outputs from the photodetectors, it is possible to ascertain the incident position of the radiation entering the crystal. An example of such a conventional radiation detector is illustrated in FIG. 1 and represented generally by the numeral 10.

In FIG. 1, radiation is shown entering the scintillation crystal 15 and causing scintillations at emitting point P therein. Photodetectors 20 and 30 are optically coupled to either end of scintillator 15, for example, by a transparent material such as silicon grease (not shown). Scintillation 15 is a pillar-shaped crystal of length L, and radiation is illustrated to be incident on position X.

The well known principle of position-dependent light collection associated with the detector of FIG. 1 is shown in FIG. 2, where the intersecting curves show the relationships of relative outputs A(x) and B(x) of photodetectors 20 and 30, respectively, as a function of position x (or X) of the incident radiation. Outputs Ax and Bx are attributed to light emission caused by scintillation at point P, the intersecting curves representing the fraction of light reaching the photomultipliers 20 and 30. Using conventional means (not shown), the incident position X may be determined therefrom by dividing one output by the sum of both outputs or simply comparing one output to another.

In fabricating a conventional radiation detector of the type illustrated in FIG. 1, the photodetector output responses are adjusted by methods which typically include adjusting the shape and light reflecting characteristics of the scintillation crystal. For example, crystals having a circular or tetragonal cross section may be used. Reflective coatings which have mirror-like(polished reflecting) or dispersive (disperse reflecting) characteristics may be applied to the side surfaces. An example of a mirror-like coating is aluminum foil. Barium phosphate and magnesium oxide are examples of dispersive coatings.

However, difficulties are encountered in determining the optimal combination of scintillator shape and dimensions and light reflection characteristics according to an arbitrary object, because the variation in photodetector output with respect to a change in location of the radiation incident to the scintillator is typically small. As a result, it is also difficult to obtain a high degree of position resolution in measuring the location of incident radiation.

In providing for a radiation detector with improved position resolution, it is important to provide for a photodetector output response which is sharp, that is, whose characteristic response curve of output intensity versus location of incident radiation (as illustrated in FIG. 2) possesses a steep slope, and not a gentle slope.

SUMMARY OF THE INVENTION

An object of the present invention is to provide a radiation detector having superior position resolution characteristics.

In order to achieve this object, and in accordance with the invention as embodied and broadly described herein, there is provided a radiation detector comprising an elongated scintillation element having the body with a longitudinal axis and an exterior surface for receiving incident radiation, and end surfaces at opposite ends thereof, the exterior surface having selectively configured mirror-polished portions thereon; a reflective coating surrounding the element for reflecting light produced in the element when radiation penetrates the exterior surface and is absorbed in the element; a pair of photodetector means each optically coupled to a respective end surface of the element for detecting the position of the radiation along the longitudinal axis between the end surfaces; and light reflection means formed on the exterior surface beneath the coating for optimizing the light reflection characteristics of the element at discrete intervals along the axis, the means being selectively configured and interstitially positioned relative to the mirror-polished portions of the exterior surface.

Additional objects and advantages of the invention will be set forth in the description which follows, and, in part, will be obvious from the description, or may be learned by practice of the invention. The objects and advantages of the invention may be realized and obtained by means of the instrumentalities and combinations particularly pointed out in the appended claims.

The accompanying drawings which are incorporated in and constitute a part of the specification, illustrate a preferred embodiment of the invention and, together with the summary description given above and the detailed description of the preferred embodiment including the appended claims given below, serve to explain the principles of the invention.

DESCRIPTION OF THE PREFERRED EMBODIMENT

Reference will now be made in detail to the present preferred embodiment of the invention, an example of which is illustrated in the accompanying drawings.

Figure 1:
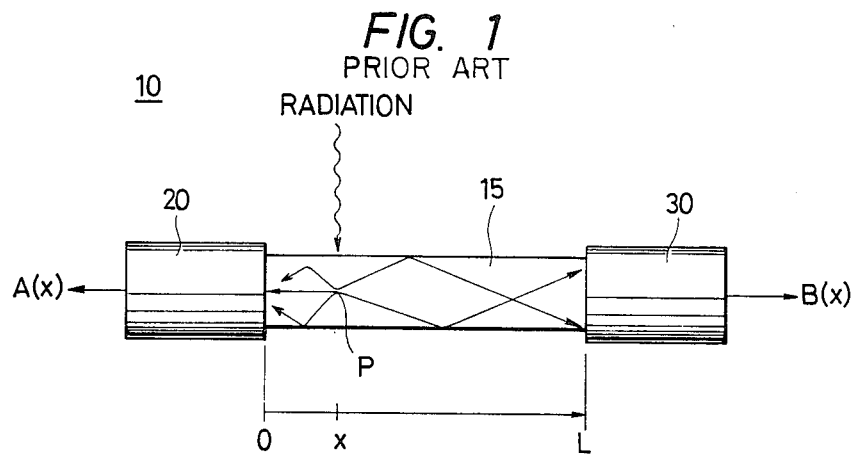
FIG. 1 is an elevation view of a conventional radiation detector.
Figure 2:
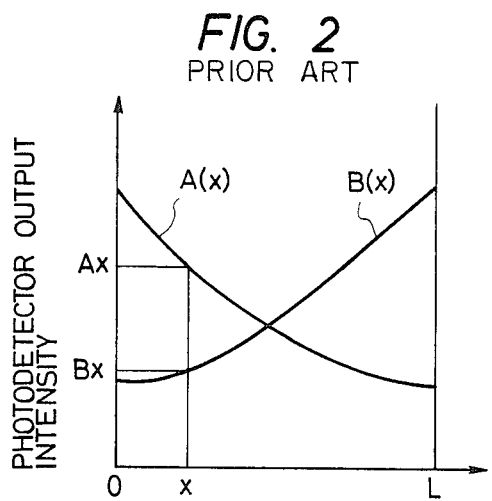
FIG. 2 illustrates the photodetector relative output intensities as a function of position of incident radiation.
Figure 3:
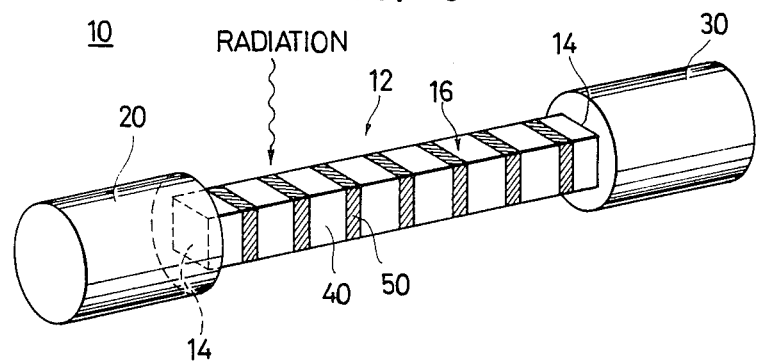
FIG. 3 is a perspective view of a radiation detector incorporating the teachings of the present preferred embodiment of the invention, with the reflective coating omitted for illustrations purposes.
Figure 4:
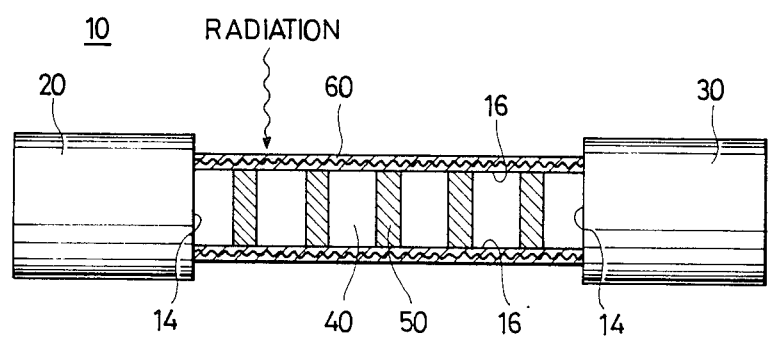
FIG. 4 is a side view in cross section of the radiation detector shown in FIG. 3, showing the reflective coating in position.

A radiation detector for providing optimized position resolution is shown in FIGS. 3 and 4 generally represented by the numeral 10. Detector 10 includes an elongated scintillation crystal having a body provided with a longitudinal axis and an exterior surface for receiving incident radiation, and end surfaces at opposite ends thereof, the exterior surface having selectively configured mirror-polished portions thereon. The invention includes a reflective coating surrounding the crystal for reflecting light produced in the crystal when radiation penetrates the exterior surface and enters the crystal thereby to prevent a leakage of the light to the outside of the crystal, and a pair of photodetector means each optically coupled to a respective end surface for detecting the axial position of radiation relative to the longitudinal axis.

As embodied herein, detector 10 includes scintillator crystal 12 positioned between photodetectors 20 and 30. Crystal 12 is pillar-shaped having a longitudinal axis (not shown) extending along its length. Preferably, crystal 12 is 100 mm in length, composed of bismuth germanium oxide, and formed to have a square or tetragonal cross-section shape. End surfaces 14 and side surfaces 16 form the exterior surfaces of the crystal 12. Photodetectors 20 and 30 are each optically coupled to an end surface 14. Preferably, a material such as silicon grease is used to provide for optical coupling. Mirror polished portions 40 are provided on side surfaces 16. Reflective coating 60 surrounds crystal 12 on all sides 16, but ends 14 are not coated with coating 60.

Figure 14:
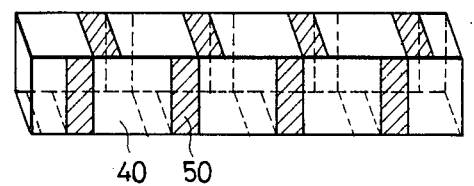
FIG. 14, is a schematic of an alternate arrangement of rough-ground bands.
Figure 15:
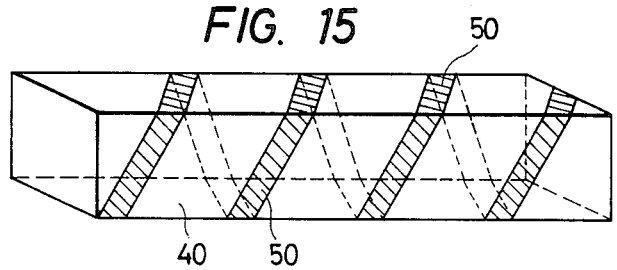
FIG. 15 is a schematic of a spiral arrangement of rough-ground bands.

The invention includes light reflective means formed on the exterior surface beneath the reflective coating for optimizing the position resolution by varying the light reflection characteristics of the crystal at discrete intervals along the axis. These means are selectively configured and interstitially positioned relative to the mirror-polished portions of the exterior surface of the crystal. As embodied herein, a plurality of elongated bands 50 is comprised of roughened portions of side surfaces 16. Surface roughening of crystal 12 to form bands 50 may be accomplished, for example, by application of emergy paper. Side surfaces 16 are provided with the bands 50 spaced interstitially relative to mirror-polished portions 40, that is the zebra-patterned roughened portion. Reflective coating 60 covers bands 50 and mirror-polished portions 40. Preferably, coating 60 is composed of magnesium oxide or barium phosphate. Bands 50 are aligned perpendicular to the longitudinal axis of the crystal 10 and spaced equidistant from one another, as shown in FIG. 3. Other possible arrangements of bands 50 are illustrated in FIGS. 14 and 15. Possible other arrangements not illustrated in the drawings include the grouping bands 50 either in the center portion or near the end portions of the crystal 12.

In operation, by varying the light reflection characteristics of crystal 12 at discrete intervals along the longitudinal axis, through use of bands 50 which are selectively configured and interstitially positioned relative to mirror-polished portions 40, the position resolution characteristics of detector 10 may be optimized. It is further desirable to provide for optimum resolution irrespective of the axial location of radiation incident to the crystal. In the present invention, the position resolution may be optimized for various parametric conditions such as optical and other material qualities of the scintillation crystal, dimensions of the crystal, and type and optical quality of the reflective coating.

Figure 5:
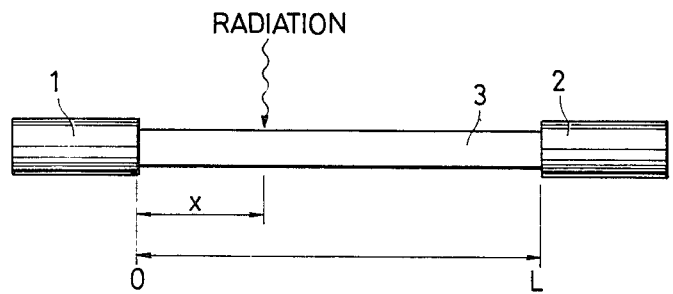
FIG. 5 is a schematic of the radiation detector illustrated in FIG. 3, where X is the position of incident radiation and L is the length of the scintillator.
Figure 6:
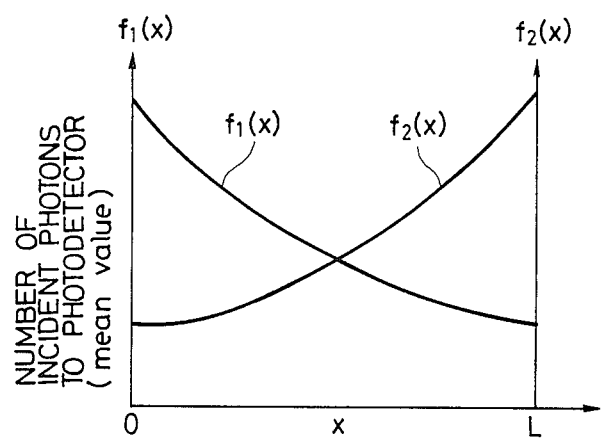
FIG. 6 is an illustrative plot of the mean value of the number of photons to the photodetectors versus position of incident radiation.

FIGS. 5 through 17 illustrate the principles underlying the present invention. As shown in FIG. 6, the mean value of the number of photons incident upon photodetectors 1, 2 per event of radiation entering crystal 3 at a position X relative to the length of crystal 3 (FIG. 5) may be represented by functions $f_1(x)$ and $f_2(x)$, respectively.

Assuming that $f_1(x)$ and $f_2(x)$ are subject to the Poisson distribution, the incident position of the radiation is presumed by means of the method known as the Maximum Likelihood Method or ML method.

The ML method is generally defined as follows. $P(z;\theta)$ represents a density function of a random variable (z), and $\theta$ represents a population parameter. When N measurements (observations) are conducted for the random variable (z) and N samples $(z_1, z_2, \ldots z_N)$ are obtained, $$P_N(z;\theta) = \prod_{i=1}^{N} f(z_i;\theta) \tag{1}$$

where $P_N(Z;\theta)$ represents a probability for obtaining the N samples each of which has a density function of $f(z_i;\theta)$ $(i=1, 2 \ldots, N)$. $P_N(Z;\theta)$ is the so-called "likelihood function".

When the equation (1) is subjected to logarithmic operation, $$L_N(z;\theta) = \ln P_N(z;\theta) = \sum_{i=1}^{N} \ln f(z_i;\theta) \quad (2)$$

In the ML method, a $\theta$max for maximizing the likelihood function $L_N(Z;\theta)$, that is, $P_N(z;\theta)$ is presumed as the population parameter $\theta$. Accordingly, differentiating the equation (1) with respect to $\theta$, the value $\theta$max for making the differentiated function zero is presumed as the $\theta$. $\theta$max is obtained by solving, $$\frac{\partial L_N(z;\theta)}{\partial \theta} = 0$$

Further, the variance $\sigma$ of the $\theta$max to be presumed as the population parameter $\theta$ is defined by the following inequality, $$\sigma \geq \left\{ \frac{-1}{E\left[\frac{\partial^2 L_N(z;\theta)}{\partial \theta^2}\right]} \right\}^{\frac{1}{2}}$$

where E represents an expected value.

When the ML method as described above is applied to the presumption of the incident position of the radiation according to this invention, the following information is obtained, $$L = \sum_{i=1}^{2} \ln\left[\frac{f_i(x)^{n_i}}{n_i!} \cdot e^{-f_i(x)}\right]$$
$$= \sum_{i=1}^{2} [n_i \ln f_i(x) - f_i(x) - \ln n_i!]$$

where $n_1$ and $n_2$ represent the numbers of incident photons to photodetectors 1 and 2. When the above equation is differentiated with respect to the presumed distance X, and the thus differentiated equation is made equal to zero, $X_{max}$, that is, the incident position of the radiation is obtained, $$\frac{\partial L}{\partial x} = \sum_{i=1}^{2} \left[\frac{n_i}{f_i(x)} - 1\right] \cdot \frac{df_i(x)}{dx}\bigg|_{x=x_{max}} = 0$$

where $X_{max}$ represents the value for making the differentiated equation equal to zero, that is, $X_{max}$ is a population parameter presumed by the ML method. Further, the variance $\sigma$ of this case is obtained as the following inequality, $$\sigma \geq \left\{ \left(\frac{df_1(x)}{dx}\right)^2 / f_1(x) + \left(\frac{df_2(x)}{dx}\right)^2 / f_2(x) \right\}^{-\frac{1}{2}}$$

The minimum value of the position resolution R corresponds to the minimum value of the variance, and is obtained as the following equation, $$R = \left\{ \left(\frac{df_1(x)}{dx}\right)^2 / f_1(x) + \left(\frac{df_2(x)}{dx}\right)^2 / f_2(x) \right\}^{-\frac{1}{2}}$$

Figure 7:
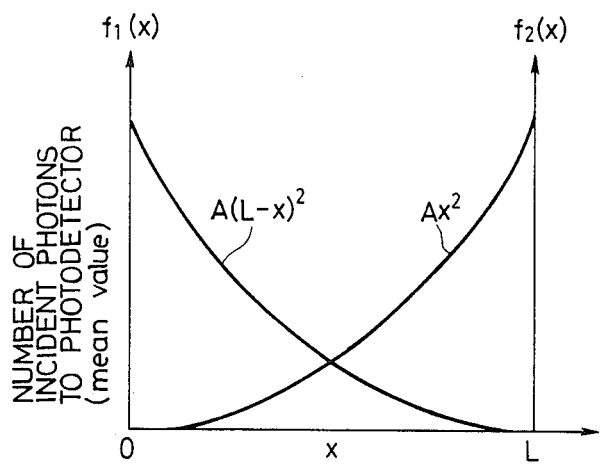
FIG. 7 is an illustrative plot of quadratic functions which are representative of functions $f_1(x)$ and $f_2(x)$ as shown in FIG. 6, respectively.

It is apparent from the above equation that a quadratic or trigonometric function causes position resolution to be constant irrespective of the position x over the whole scintillation crystal. FIG. 7 shows an illustrative plot of the functions $f_1(x)$ and $f_2(x)$ in a case where the highest position resolution is obtained in second order functions. Therefore, according to the present invention, by varying the light reflection characteristics of the scintillation crystal, that is, functions $f_1(x)$ and $f_2(x)$, for a given radiation detector, an optimum position resolution may be obtained irrespective of the axial location of radiation incident to the crystal.

Figure 8:
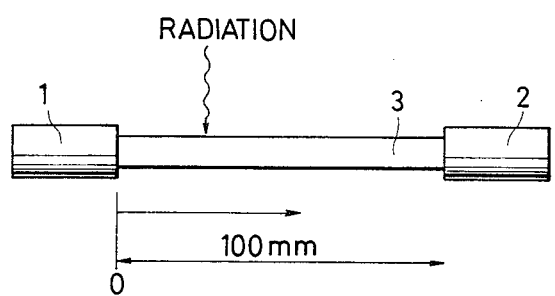
FIG. 8 is a schematic of a radiation detector in which the crystal is tetragonal in shape, fabricated of bismuth germanium oxide, 3 mm×5 mm in cross-sectional area and 100 mm in length.
Figure 9:
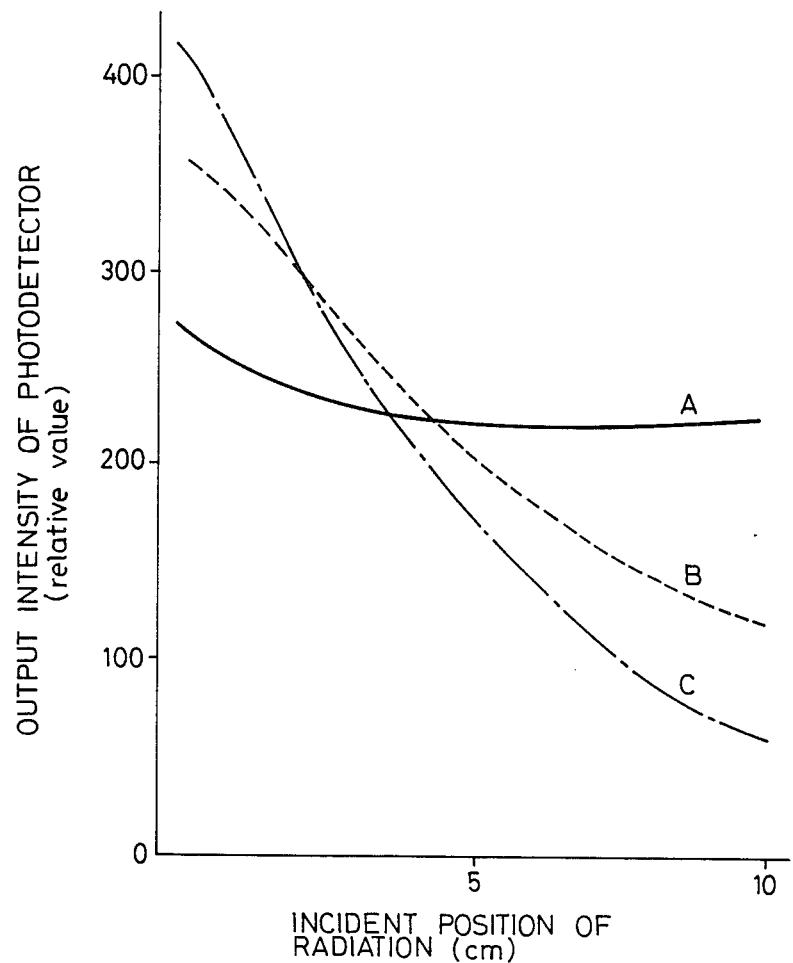
FIG. 9 is an illustrative plot of the relative value of the output intensity of a photodetector of FIG. 8.

To illustrate the above principles of operation, a crystal of bismuth germanium oxide having tetragonal cross-section dimensions of 3 mm×5 mm and being 100 mm in length was fabricated, as shown in FIG. 8. The variation of output intensity of photodetector 1 versus the axial distance of incident radiation entering crystal 3 is plotted in FIG. 9 for three different ratios in numbers or areas of rough-ground band portions to mirror-polished portions on the surface of crystal 3. Similar plots would be obtained in a case where detector 7 is selected. Curve A represents a crystal 3 having wholly mirror-polished side surfaces; curve B represents a crystal 3 having a small number or area of rough-ground bands; and curve C represents a crystal 3 having a large number or area of rough-ground bands.

In case A, there is little variation because light resulting from radiation entering the crystal propagates within the crystal with total reflection. As shown in cases B and C, however, as the relative number or area of rough-ground bands is increased compared to the number or area of mirror-polished portions, light is no longer totally reflected. As a result, the variation in output intensity compared to case A is dependent to a greater degree on the incident position of the radiation, and thus, a superior response characteristic for cases B and C may be obtained.

Figure 10:
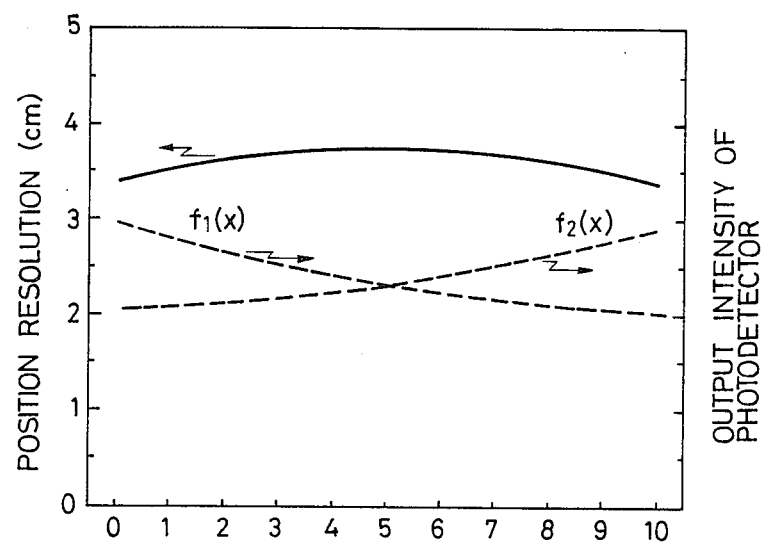
FIG. 10 is an illustrative plot showing calculated position resolutions for incident radiations of 662 keV of gamma-rays irradiating on a crystal for which the side surfaces are wholly mirror-polished.
Figure 11:
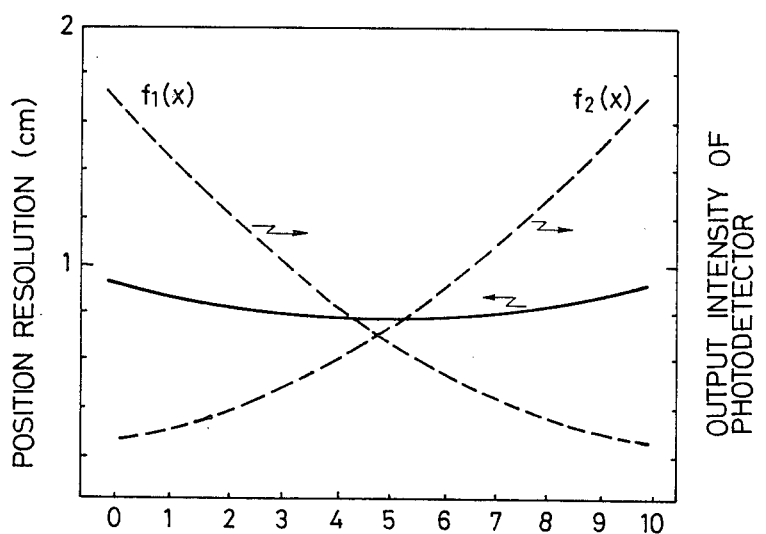
FIG. 11 is an illustrative plot as in FIG. 10, except that the side surfaces of the crystal have a large number of rough-ground bands.

FIGS. 10 and 11 show calculated position resolutions for 662 keV of gamma rays for the crystal having wholly mirror-polished side surfaces and having a large number or area of rough-ground bands, respectively. As is apparent from FIGS. 10 and 11, the position resolution can be improved when the detector response is sharp, that is, when the slope of the output intensity curve is steep. Further, since the slope is relatively gentle corresponding to a mirror-polished portion of the crystal surface and relatively steep corresponding to a rough-ground portion, an arbitrary gradient of the response can be provided by positioning rough-ground bands at selected locations on the crystal surface.

Figure 12:
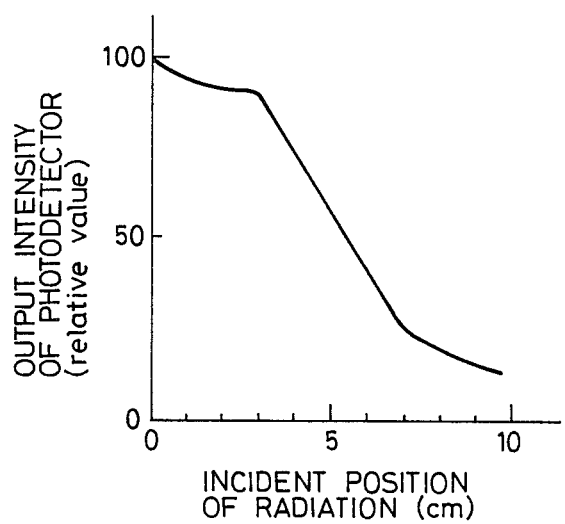
FIG. 12 is an illustrative plot of the relative value of the output intensity of a photodetector, such as illustrated in FIG. 3, except that the rough-ground bands are grouped in the center portion of the crystal.
Figure 13:
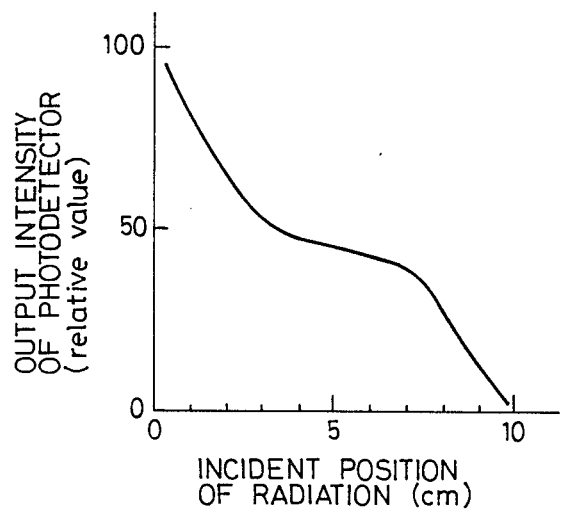
FIG. 13 is an illustrative plot as in FIG. 12, except that the rough-ground bands are grouped at the end portions of the crystal.

FIGS. 12 and 13 show various output intensities of detectors having alternate arrangements of rough-ground and mirror-polished portions. In FIG. 12, the rough-ground portions are grouped or clustered within the center portion of the crystal, and in FIG. 13 are grouped at the end portions of the crystal. As shown, by selectively grouping rough-ground portions it is possible to vary the slope of the response curve at arbitrary points on the curve corresponding to the axial position of the rough-ground portions.

Figure 16:
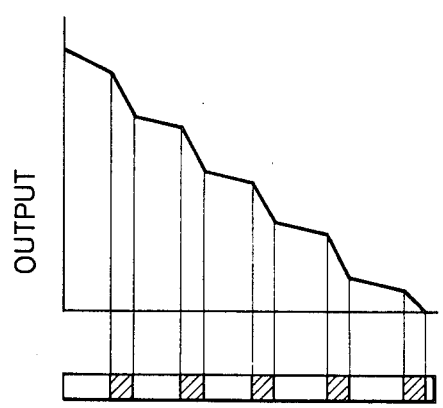
FIG. 16 is a schematic representation of the photodetector output intensity corresponding to a crystal having rough-ground bands arranged as shown in FIG. 3.
Figure 17:
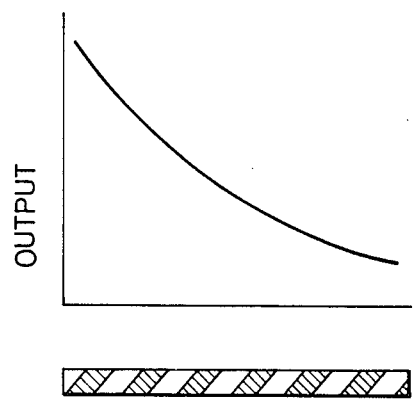
FIG. 17 is a schematic representation of the photodetector output intensity corresponding to a crystal having rough-ground bands arranged as shown in FIG. 15.

FIG. 14 and 15 show alternate and spiral arrangements of rough-ground bands on the surface of a crystal. As shown in FIGS. 16 and 17, corresponding to the arrangements shown in FIGS. 3 and 15, respectively, a smooth output response may be obtained by providing a contiguous path, resembling a spiral, of rough-ground portions.

In the specification, the structure and effect according to this invention were described above, particularly in a case where a crystal is employed as a scintillation element. However, the scintillation element according to this invention is not limited to the crystal. For example, a scintillator comprising plastic, liquid or gas may be employed as a scintillation element.

According to this invention, an output response is varied by adjusting length, pitch and width of a rough-ground poriton in the zebra-pattern on a scintillation crystal, thereby to improve position resolution of a scintillator. Furthermore, bands of the rough-ground portion are grouped in a desired location of the scintillation crystal, so that a good position resolution can be obtained at a desired location according to an object.

It will be apparent to those skilled in the art that various modifications, variations and additions can be made in the light fixture of the present invention without departing from the spirit or scope of the present invention. Thus, it is intended that the present invention cover the modifications and variations provided they come within the general scope of the claims and their equivalents.

What is claimed is:

1. A radiation detector, comprising:
   an elongated scintillation element having a body with a longitudinal axis and an exterior surface for receiving incident radiation, said element having end surfaces at opposite ends thereof, said exterior surface having selectively configured mirror-polished portions thereon;
   a reflective coating surrounding said element for reflecting light produced in said element when said radiation penetrates said exterior surface and enters said element;
   a pair of photodetector means each optically coupled to a respective said end surface for detecting the position of said radiation along said longitudinal axis between said end surfaces; and
   light reflection means formed on said exterior surface beneath said coating for optimizing the position resolution by varying the light reflection characteristics of said crystal at discrete intervals along said axis, said means selectively configured and interstitially positioned relative to said mirror-polished portions of said exterior surface.

2. A radiation detector as claimed in claim 1, wherein said element is pillar-shaped;
   said exterior surface includes four planar side surfaces;
   said light reflection means formed on said exterior surface includes a plurality of elongated bands, said bands comprising roughened portions on said side surfaces and having a predetermined width and an aligned orientation relative to said longitudinal axis.

3. A radiation detector as claimed in claim 2, wherein each of said bands is aligned perpendicular to said longitudinal axis and spaced axially equidistant one from another on said respective side surfaces.

4. A radiation detector as claimed in claim 3, wherein each part of said bands on a side surface is shifted at a distance equal to said band width relative to another part formed on a side surface adjacent to said side surface.

5. A radiation detector as claimed in claim 2, wherein each of said bands is aligned at an acute angle relative to said longitudinal axis and arranged so that bands formed on adjacent sides are abutted to form a contiguous path.

6. A radiation detector as claimed in claim 2, wherein said bands are spaced irregularly one from another.

7. A radiation detector as claimed in claim 2, wherein said band width and aligned orientation is variable from one band to another.

8. A radiation detector as claimed in claim 2, wherein said element has a length of 100 mm and a tetragonal cross section having dimensions of 3 mm×5 mm.

9. A radiation detector as claimed in claim 2, wherein said coating is magnesium oxide.

10. A radiation detector as claimed in claim 2, wherein said coating is barium phosphate.

11. A radiation detector as claims in claim 2, wherein said element is a square in cross-section.

12. A radiation detector as claimed in claim 2, wherein said crystal is composed of bismuth germanium oxide.

13. A radiation detector, comprising:
    an elongated scintillation element having a body with a longitudinal axis and an exterior surface for receiving incident radiation, said element having end surfaces at opposite ends thereof, said exterior surface having selectively configured mirror-polished portions thereon;
    a reflective coating surrounding said element for reflecting light produced in said element when said radiation penetrates said exterior surface and enters said element;
    a pair of photodetector means each optically coupled to a respective said end surface for detecting the position of said radiation along said longitudinal axis between said end surfaces; and
    light reflection means formed on said exterior surface beneath said coating for optimizing the position resolution by varying the light reflection characteristics of said crystal at discrete intervals along said axis, said means selectively configured and interstitially positioned relative to said mirror-polished portions of said exterior surface;
    wherein said element is pillar-shaped;
    wherein said exterior surface includes four planar side surfaces;
    wherein said light reflection means includes a plurality of elongated bands, said bands comprising roughened portions on said side surfaces and having a predetermined width and an aligned orientation relative to said longitudinal axis;
    wherein each of said bands is aligned perpendicular to said longitudinal axis and spaced axially equidistant one from another on said respective side surfaces; and
    wherein each part of said bands on a side surface is shifted at a distance equal to said band width relative to another part formed on a side surface adjacent to said side surface.

14. The radiation detector of claim 13, wherein each of said bands is aligned at an acute angle relative to said longitudinal axis and arranged so that bands formed on adjacent sides are abutted to form a contiguous path.

15. The radiation detector of claim 14, wherein said band width and aligned orientation is variable from one band to another.

* * * * *

UNITED STATES PATENT AND TRADEMARK OFFICE
CERTIFICATE OF CORRECTION

PATENT NO. : 4,870,280

DATED : September 26, 1989

INVENTOR(S) : Takaji Yamashita et al

It is certified that error appears in the above-identified patent and that said Letters Patent is hereby corrected as shown below:

On the title page, item [73] Assignee: should read as
--Hamamatsu Photonics Kabushiki Kaisha & Research
  Development Corporation of Japan--.

Signed and Sealed this

Sixth Day of July, 1993

Attest:

MICHAEL K. KIRK

*Attesting Officer*    Acting Commissioner of Patents and Trademarks